US007659568B2

(12) United States Patent
Kusano et al.

(10) Patent No.: US 7,659,568 B2
(45) Date of Patent: Feb. 9, 2010

(54) MONOLITHIC CERAMIC CAPACITOR AND METHOD FOR ADJUSTING EQUIVALENT SERIES RESISTANCE THEREOF

(75) Inventors: Mitsuhiro Kusano, Omihachiman (JP); Shizuharu Watanabe, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 425 days.

(21) Appl. No.: 11/670,540

(22) Filed: Feb. 2, 2007

(65) Prior Publication Data

US 2007/0128794 A1   Jun. 7, 2007

Related U.S. Application Data

(63) Continuation of application No. PCT/JP2005/015270, filed on Aug. 23, 2005, and a continuation of application No. PCT/JP2005/010025, filed on Jun. 1, 2005.

(30) Foreign Application Priority Data

Aug. 27, 2004 (JP) ............... 2004-248438
Dec. 22, 2004 (JP) ............... 2004-370533

(51) Int. Cl.
*H01L 27/108* (2006.01)
(52) U.S. Cl. .............. 257/307; 257/303; 257/306; 257/308; 257/516; 257/532; 257/E21.647; 257/E27.048; 257/E29.345; 438/239; 438/381; 438/396; 361/321.2; 361/321.4
(58) Field of Classification Search ......... 257/303, 257/306–308, 516, 532, E21.647, E27.048, 257/E59.345; 438/239, 381, 396; 361/321.2, 361/321.4
See application file for complete search history.

(56) References Cited

U.S. PATENT DOCUMENTS

| 4,604,676 | A | | 8/1986 | Senda et al. | |
| 4,607,316 | A | * | 8/1986 | Wada et al. | ............... 361/321.4 |
| 5,014,158 | A | * | 5/1991 | Nishimura et al. | ....... 361/321.4 |

(Continued)

FOREIGN PATENT DOCUMENTS

EP  0 777 242 A2  6/1997

(Continued)

OTHER PUBLICATIONS

Official Communication for PCT Application No. PCT/JP2005/015270; mailed on Nov. 22, 2005.

(Continued)

*Primary Examiner*—Andy Huynh
(74) *Attorney, Agent, or Firm*—Keating & Bennett, LLP

(57) ABSTRACT

An external electrode structure for a monolithic ceramic capacitor provided with a function as a resistance element is capable of preventing a reduction of the external electrode due to baking in a reducing atmosphere, so that Ni or a Ni alloy can be used in an internal electrode and a good electrical connection between the internal electrode and the external electrode is achieved. The external electrodes disposed on an outer surface of a capacitor main body include an electrically conductive layer and a metal plating layer disposed thereon, and the electrically conductive layer includes a compound oxide, e.g., an In—Sn compound oxide, which reacts with Ni or the Ni alloy, and a glass component.

14 Claims, 3 Drawing Sheets

U.S. PATENT DOCUMENTS

| | | | | |
|---|---|---|---|---|
| 5,036,425 | A | * | 7/1991 | Omori et al. ............ 361/321.4 |
| 5,117,326 | A | * | 5/1992 | Sano et al. ............. 361/321.4 |
| 5,225,960 | A | * | 7/1993 | Kishi et al. ............ 361/321.5 |
| 5,659,456 | A | * | 8/1997 | Sano et al. ............. 361/321.4 |
| 5,835,339 | A | * | 11/1998 | Sakamoto et al. ........ 361/321.2 |
| 6,124,769 | A | * | 9/2000 | Igarashi et al. ............ 333/172 |
| 6,585,796 | B2 | * | 7/2003 | Hosokura et al. ............ 75/373 |
| 2004/0027787 | A1 | | 2/2004 | Yamauchi et al. |
| 2006/0044098 | A1 | | 3/2006 | Kimura et al. |

FOREIGN PATENT DOCUMENTS

| | | |
|---|---|---|
| FR | 2 655 179 A1 | 5/1991 |
| JP | 61-158128 A | 7/1986 |
| JP | 04-337616 A | 11/1992 |
| JP | 05-290621 A | 11/1993 |
| JP | 11-121276 A | 4/1999 |
| JP | 11-297581 A | 10/1999 |
| JP | 2000-223348 A | 8/2000 |
| JP | 2001-223132 A | 8/2001 |
| JP | 2001-273816 A | 10/2001 |
| JP | 2004-47536 A | 2/2004 |
| JP | 2004-128328 A | 4/2004 |

OTHER PUBLICATIONS

Official Communication for PCT Application No. PCT/JP2005/010025; mailed on Sep. 13, 2005.

Official communication issued in counterpart Korean Application No. 10-2007-7003940, mailed on May 1, 2008.

Official communication issued in the counterpart Japanese Application No. 2006-531915, mailed on Jul. 17, 2007.

Official Communication issued in counterpart European Patent Application No. 05775081.2, mailed on May 12, 2009.

* cited by examiner

MONOLITHIC CERAMIC CAPACITOR AND METHOD FOR ADJUSTING EQUIVALENT SERIES RESISTANCE THEREOF

BACKGROUND OF THE INVENTION

1. Field of the Invention

The present invention relates to a monolithic ceramic capacitor and a method for adjusting an equivalent series resistance thereof. In particular, the present invention relates to a monolithic ceramic capacitor including external electrodes which function as a resistance element and a method for adjusting an equivalent series resistance thereof.

2. Description of the Related Art

Heretofore, a monolithic ceramic capacitor has been used to eliminate high-frequency voltage fluctuations of a smoothing circuit, whereas a tantalum capacitor or an aluminum electrolytic capacitor has been used for eliminating low-frequency voltage fluctuations.

As described above, the monolithic ceramic capacitor has been used merely for eliminating high-frequency voltage fluctuations because the equivalent series resistance (ESR) of the monolithic ceramic capacitor is less than those of the tantalum capacitor and the aluminum electrolytic capacitor and, therefore, the components defining the equivalent circuit of the monolithic ceramic capacitor becomes substantially merely a C component and an L component, so that oscillation occurs easily in response to low-frequency voltage fluctuations and noise is generated. Consequently, in order to eliminate low-frequency voltage fluctuations, a capacitor, which does not oscillate in response to low-frequency voltage fluctuations, having a large ESR, that is, the above-described tantalum capacitor or the aluminum electrolytic capacitor must be used.

However, the tantalum capacitor and the aluminum electrolytic capacitor are large as compared to the monolithic ceramic capacitor, and miniaturization of an electronic apparatus provided with such a capacitor is inhibited.

On the other hand, a method, in which a resistance element defined by a discrete component is connected to a monolithic ceramic capacitor in series and, thereby, a circuit is provided with a resistance component so as to suppress oscillation in response to low-frequency voltage fluctuations, is also used. However, in this case, a mounting area for connecting the resistance element defined by a discrete component is required. This also inhibits miniaturization of the electronic apparatus.

In order to solve the above-described problems, it has been proposed to provide a function as a resistance element to external electrodes included in a monolithic ceramic capacitor.

For example, Japanese Unexamined Patent Application Publication No. 4-337616 (Patent Document 1) describes that a metal oxide film is formed on an external electrode surface, and the thickness of the metal oxide film is changed by processing, e.g., barrel polishing, so as to adjust the ESR.

Japanese Unexamined Patent Application Publication No. 11-121276 (Patent Document 2) describes that an intermetallic compound between an external electrode and Sn is formed so as to adjust the ESR.

Japanese Unexamined Patent Application Publication No. 2001-223132 (Patent Document 3) describes that an external electrode is configured to have a three-layer structure composed of a first electrically conductive layer formed from an oxidation-resistant metal, a second electrically conductive layer which is disposed thereon and which is a mixture of an electrically conductive oxide and an insulating oxide, and a third electrically conductive layer which is disposed thereon and which is formed from an oxidation-resistant metal so as to increase the ESR.

In an example described in Patent Document 3, the first electrically conductive layer is formed by baking in a $N_2$ or $N_2/H_2$ atmosphere. The second electrically conductive layer primarily includes ruthenium oxide, a ruthenium oxide compound, or graphite, and is formed by baking in air. The third electrically conductive layer has a primary component including at least one type of metal selected from Pd, Ag, Pt, Au, Rh, Ir, and Ru, and is formed by baking in air.

However, individual technologies described in the above-described Patent Documents 1 to 3 have the following problems.

The technology described in Patent Document 1 has a problem in that the adjustment of the ESR is relatively difficult because the ESR is adjusted by the thickness of the metal oxide film.

The technology described in Patent Document 2 has a problem in that it is difficult to attain an adequate ESR because the resistivity of the intermetallic compound is relatively small.

In the technology described in Patent Document 3, the external electrode is a thick film and has a three-layer structure, with each layer being formed by baking. Therefore, the thickness of the entire external electrode is increased, and miniaturization of the component is inhibited. Furthermore, since the oxidation-resistant metal is a noble metal, the material costs of the first and the third electrically conductive layer formed from the oxidation-resistant metal are increased.

In the technology described in Patent Document 3, if ruthenium oxide is used as the material for the second electrically conductive layer, baking in an oxidizing atmosphere, e.g., in air, is indispensable because reduction occurs due to firing in a neutral or reducing atmosphere, e.g., in the $N_2$ atmosphere. However, in order to endure the baking in the oxidizing atmosphere, an expensive noble metal must be used as the material for the internal electrode disposed in the capacitor main body, and it becomes impossible to use Ni or an Ni alloy, which is presently a commonly used material, as the material for the internal electrode.

In the case where a resistant component, e.g., a ruthenium oxide compound which is not reduced, is used as the material for the above-described second electrically conductive layer, a layer for ensuring the continuity to the internal electrode is further required because a highly reliable electrical connection is not ensured between the second electrically conductive layer and the internal electrode. The above-described first electrically conductive layer has a function of ensuring the continuity to the internal electrode as well. Therefore, in the technology described in Patent Document 3, the first to third electrically conductive layers are indispensable, and an increase in the thickness of the external electrode cannot be avoided.

SUMMARY OF THE INVENTION

To overcome the problems described above, preferred embodiments of the present invention provide a monolithic ceramic capacitor including external electrodes capable of solving the above-described problems and a method for adjusting the equivalent series resistance thereof.

A preferred embodiment of the present invention is directed to a monolithic ceramic capacitor including a capacitor main body having a layered structure, in which ceramic layers and internal electrodes are layered alternately, and external electrodes disposed on an outer surface of the capacitor main body so as to be electrically connected to the internal electrodes, wherein the internal electrode includes Ni or a Ni alloy, and the external electrode includes a first electrically conductive layer including a compound oxide, which reacts with the Ni or the Ni alloy, and a glass component.

Preferably, the above-described compound oxide includes an In—Sn compound oxide.

Preferably, the external electrode further includes a metal plating layer disposed on the outer surface side of the first electrically conductive layer. In this case, more preferably, the external electrode further includes a second electrically conductive layer, which is disposed between the first electrically conductive layer and the metal plating layer and which includes Cu or a Cu alloy, or a second electrically conductive layer including an electrically conductive resin primarily including an electrically conductive metal component and a thermosetting resin.

Preferably, the above-described metal plating layer includes a Ni plating layer functioning as a substrate and a Sn plating layer or a solder plating layer disposed on the Ni plating layer.

The first electrically conductive layer may further include an electrically conductive metal component or an insulating oxide for adjusting the resistance value of the external electrode.

Another preferred embodiment of the present invention is directed to a method for adjusting an equivalent series resistance of the above-described monolithic ceramic capacitor, that is, the monolithic ceramic capacitor including a capacitor main body having a layered structure, in which ceramic layers and internal electrodes are layered alternately, and external electrodes disposed on an outer surface of the capacitor main body so as to be electrically connected to the internal electrodes, wherein the internal electrode includes Ni or a Ni alloy, and the external electrode includes an electrically conductive layer including a compound oxide, which reacts with the above-described Ni or the Ni alloy, and a glass component.

The method for adjusting an equivalent series resistance of a monolithic ceramic capacitor according to this preferred embodiment of the present invention includes the step of adjusting the resistance value of the external electrode by changing at least one of the amount of glass component included in the electrically conductive layer and the glass softening point.

Preferably, an In—Sn compound oxide is used as the above-described compound oxide included in the electrically conductive layer.

When the electrically conductive layer included in the external electrode includes an electrically conductive metal component or an insulating oxide, in addition to a compound oxide and a glass component, the resistance value of the external electrode is adjusted by changing at least one of the amount of added glass component, the glass softening point, and the amount of added electrically conductive metal component or the insulating oxide.

When the external electrode includes a first electrically conductive layer, which includes a compound oxide and a glass component, and a second electrically conductive layer which is disposed on the outer surface side of the first electrically conductive layer and which includes an electrically conductive resin primarily including an electrically conductive metal component and a thermosetting resin, the resistance value of the external electrode is adjusted by changing at least one of the amount of added glass component included in the first electrically conductive layer, the glass softening point, and the amount of added electrically conductive metal component included in the second electrically conductive layer.

When the above-described first electrically conductive layer includes an electrically conductive metal component or an insulating oxide in addition to a compound oxide and a glass component, the resistance value of the external electrode is adjusted by changing at least one of the amount of added glass component included in the first electrically conductive layer, the glass softening point, the amount of the electrically conductive metal component or an insulating oxide, and the amount of added electrically conductive metal component included in the second electrically conductive layer.

In the method for adjusting an equivalent series resistance of a monolithic ceramic capacitor according to this preferred embodiment of the present invention, the method may further include the step of adjusting the equivalent series resistance of the monolithic ceramic capacitor by changing the length of a side, which is in contact with the first electrically conductive layer, of the lead portion electrically connected to the external electrode with respect to at least one of the internal electrodes.

When the above-described method for adjusting an equivalent series resistance is applied, in the typical structure of the monolithic ceramic capacitor, the length of a side, which is in contact with the first electrically conductive layer, of the lead portion of at least one of the internal electrodes is less than the length of the side, which is opposed to the lead portion, of the internal electrode.

The inventors of the present invention have conducted extensive research on a substance capable of being a resistant component (an electrically conductive component having a predetermined resistance value), and as a result, a compound oxide, e.g., an In—Sn compound oxide or a La—Cu compound oxide, which reacts with Ni or a Ni alloy, has been discovered.

Since the above-described compound oxide has adequate reduction resistance, baking in a neutral or reducing atmosphere, e.g., a $N_2$ atmosphere, is applied without problems. As a result, even when Ni or a Ni alloy is used in the internal electrode disposed in the capacitor main body, no problem occurs.

Furthermore, since an intermetallic compound, e.g., a Ni—Sn intermetallic compound or a Ni—Cu intermetallic compound, is provided between the above-described compound oxide and the internal electrode including Ni or the Ni alloy, a highly reliable electrical connection state between the first electrically conductive layer, which is disposed in the external electrode and which includes the above-described compound oxide, and the internal electrode is achieved. Consequently, a layer for ensuring the continuity between the first electrically conductive layer and the internal electrode is not specifically required, an increase of the thickness of the external electrode is avoided, and as a result, miniaturization of the monolithic ceramic capacitor is facilitated.

An adequate connection state cannot be achieved when the external electrode and the internal electrode are merely in contact with each other. As described above, the external electrode and the internal electrode chemically react so as to form, for example, a solid solution or an intermetallic compound and, thereby, an adequate connection state is achieved. For the monolithic ceramic capacitor, to which the present invention is directed, in particular, the external electrode and the internal electrode must be securely connected to each other. Therefore, a compound oxide, which reacts with Ni or the Ni alloy, must be included in the first electrically conductive layer in direct contact with the internal electrode including Ni or the Ni alloy.

The resistance value of the first electrically conductive layer including the above-described compound oxide and the glass component can easily be controlled, as is clear from the effect of the method for adjusting a equivalent series resistance described below.

In the monolithic ceramic capacitor according to a preferred embodiment of the present invention, when the external electrode further includes a metal plating layer disposed on the outer surface side of the first electrically conductive layer, the weather resistance of the monolithic ceramic capacitor is ensured and, in addition, the monolithic ceramic capacitor is suitable for a surface-mounting component.

When the external electrode further includes the second electrically conductive layer, which is disposed between the above-described first electrically conductive layer and the metal plating layer and which includes Cu or a Cu alloy, the weather resistance of the monolithic ceramic capacitor is further improved and, in addition, the monolithic ceramic capacitor can be provided with adequate plating resistance required in the plating step for forming the metal plating layer.

When the external electrode further includes the second electrically conductive layer, which is disposed between the above-described first electrically conductive layer and the metal plating layer and which includes the electrically conductive resin primarily including the electrically conductive metal component and the thermosetting resin, not only effects similar to those in the above-described case where the second electrically conductive layer including Cu or the Cu alloy is further included are provided, but also an effect that the resistance value of the external electrode can also be adjusted by changing the amount of added electrically conductive metal component included in the second electrically conductive layer is provided. For the second electrically conductive layer including Cu or the Cu alloy, a baking treatment at a temperature of, for example, about 800° C. is required to form it. However, the second electrically conductive layer including the above-described electrically conductive resin can be formed by a heat-curing treatment at a relatively low temperature of about 250° C., for example. Therefore, the energy required for heating is reduced as compared to that where the second electrically conductive layer includes Cu or the Cu alloy, and heating facilities can be further simplified, so that the steps can be further simplified.

When the metal plating layer includes the Ni plating layer functioning as a substrate and the Sn plating layer or the solder plating layer disposed on the Ni plating layer, the external electrode is provided with outstanding solderability and, therefore, the monolithic ceramic capacitor is suitable for surface mounting by soldering.

When the first electrically conductive layer further includes the electrically conductive metal component or the insulating oxide for adjusting the resistance value of the external electrode, the resistance value of the external electrode can also be adjusted by changing the amount of added electrically conductive metal component or the insulating oxide.

In the method for adjusting an equivalent series resistance of a monolithic ceramic capacitor according to a preferred embodiment of the present invention, the compound oxide, e.g., the In—Sn compound oxide, which is an electrically conductive component having a predetermined resistance value, is used in the electrically conductive layer disposed in the external electrode, and the resistance value of the external electrode is adjusted by changing at least one of the amount of added glass component, which is an electrically insulating component, and the glass softening point. Therefore, the equivalent series resistance of the monolithic ceramic capacitor can easily be adjusted.

Where the above-described electrically conductive layer further includes the electrically conductive metal component or the insulating oxide, the resistance value of the external electrode can also be adjusted by changing the amount of added electrically conductive metal component or the insulating oxide in addition to the change of at least one of the amount of added glass component and the glass softening point. Consequently, the diversification of methods for adjusting the resistance value of the external electrode is facilitated.

Where the external electrode includes the second electrically conductive layer which is disposed on the outer surface side of the first electrically conductive layer and which includes the electrically conductive resin primarily including the electrically conductive metal component and the thermosetting resin, besides the above-described electrically conductive layer, that is, the first electrically conductive layer, not only the adjustment of the resistance value on the first electrically conductive layer side, but also the adjustment of the resistance value by changing the amount of added electrically conductive metal component included in the second electrically conductive layer is enabled. Consequently, the diversification of methods for adjusting the resistance value of the external electrode is further facilitated.

Furthermore, in the method for adjusting an equivalent series resistance of a monolithic ceramic capacitor according to a preferred embodiment of the present invention, the equivalent series resistance of a monolithic ceramic capacitor can also be adjusted by changing the length of the side, which is in contact with the first electrically conductive layer, of the lead portion disposed in the internal electrode. Consequently, the adjustment amount of the equivalent series resistance can be further increased with this method.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
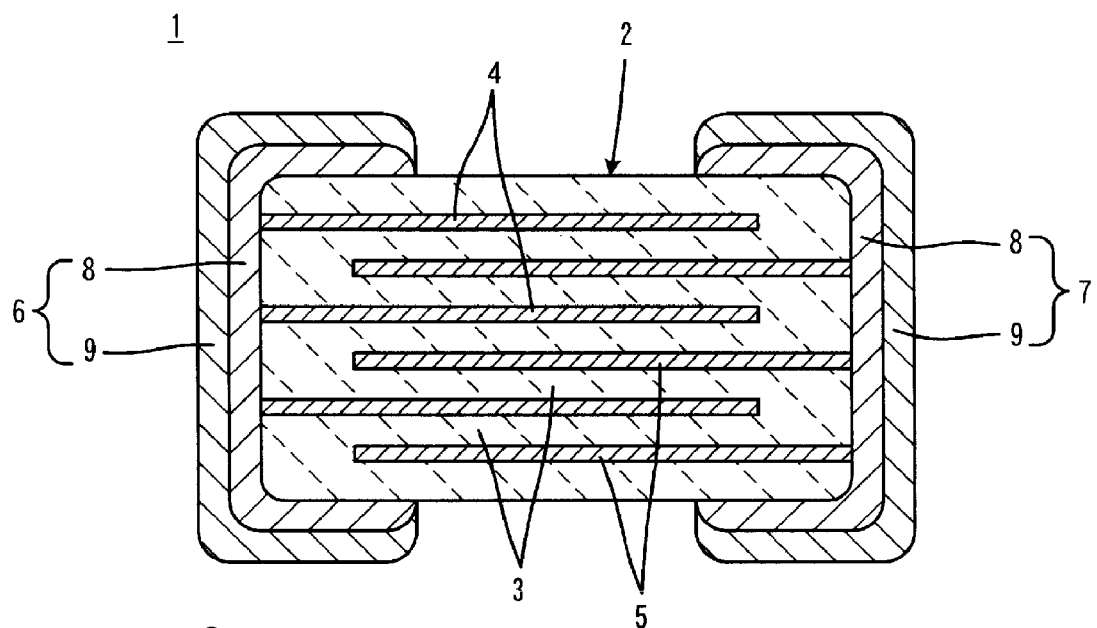
FIG. 1 is a front view illustrating a monolithic ceramic capacitor 1 according to a first preferred embodiment of the present invention with reference to a cross section along the stacking direction.

FIG. 1 shows a monolithic ceramic capacitor 1 according to a first preferred embodiment of the present invention.

The monolithic ceramic capacitor 1 includes a capacitor main body 2. The capacitor main body 2 has a layered structure in which a plurality of ceramic layers 3 made of dielectric ceramic and internal electrodes 4 and 5 including Ni or a Ni alloy are alternately layered. The internal electrodes 4 and the internal electrodes 5 are disposed in a staggered configuration, and are opposed to each other with ceramic layers 3 therebetween, such that a capacitance is produced.

External electrodes 6 and 7 are disposed on the outer surface of the capacitor main body 2, specifically on opposed end portions. One external electrode 6 is electrically connected to the internal electrodes 4, and the other external electrode 7 is electrically connected to the internal electrodes 5.

In the above-described monolithic ceramic capacitor 1, each of the external electrodes 6 and 7 includes an electrically conductive layer 8 including a compound oxide, e.g., an In—Sn compound oxide, which functions as an electrically conductive component having a predetermined resistance value and which reacts with Ni or a Ni alloy, and a glass component functioning as an electrically insulating component and a metal plating layer 9 disposed thereon.

Examples of compound oxides, which react with Ni or the Ni alloy, as described above, include a La—Cu compound oxide and a Sr—Fe compound oxide, in addition to the In—Sn compound oxide. With respect to the In—Sn compound oxide, the La—Cu compound oxide, and the Sr—Fe compound oxide, the metal elements of Sn, Cu, and Fe react with Ni or the Ni alloy.

Where the electrically conductive layer 8 includes the In—Sn compound oxide, the electrically conductive layer 8 is formed by applying a paste including an In—Sn compound oxide powder, glass frit, and an organic binder to the end portions of the capacitor main body 2, followed by baking in a $N_2$ atmosphere, for example. The above-described In—Sn compound oxide powder can be produced, for example, such that an $In_2O_3$ powder is mixed with a predetermined amount of $SnO_2$ powder, calcination is performed in air under temperature and time conditions suitable for formation of an adequate solid solution of $SnO_2$ and, thereafter, a grinding treatment is performed. Preferably, the amount of added $SnO_2$ powder is selected such that the $SnO_2$ powder is within the range of about 1 to about 15 percent by weight relative to a total amount of $In_2O_3$ powder and $SnO_2$ powder in view of the electrical conductivity and the reduction resistance.

The electrically conductive layer 8 may further include an electrically conductive metal component, e.g., Ag, or an insulating oxide, e.g., $Al_2O_3$ or $ZrO_2$, in order to adjust the resistance values of the external electrodes 6 and 7.

Although not shown in the drawings in detail, it is preferable that the metal plating layer 9 includes a Ni plating layer functioning as a substrate and a Sn plating layer or a solder plating layer disposed on the Ni plating layer.

In the above-described monolithic ceramic capacitor 1, the electrically conductive layer 8 can be baked in a neutral or reducing atmosphere, e.g., a $N_2$ atmosphere, because the compound oxide, e.g., the In—Sn compound oxide, included in the electrically conductive layer 8 has adequate reduction resistance. In this baking step, when the electrically conductive layer 8 includes, for example, the In—Sn compound oxide, a highly reliable electrical connection state between the electrically conductive layer 8 and the internal electrodes 4 and 5 can be ensured because a Ni—Sn intermetallic compound is formed between the In—Sn compound oxide and Ni or the Ni alloy included in the internal electrodes 4 and 5.

When the electrically conductive layer 8 includes the La—Cu compound oxide, a Ni—Cu intermetallic compound is formed between the La—Cu compound oxide and Ni or the Ni alloy included in the internal electrodes 4 and 5, and when the electrically conductive layer 8 includes the Sr—Fe compound oxide, a Ni—Fe intermetallic compound is formed between the Sr—Fe compound oxide and Ni or the Ni alloy included in the internal electrodes 4 and 5. Consequently, a highly reliable electrical connection state between the electrically conductive layer 8 and the internal electrodes 4 and 5 is ensured.

The presence of the metal plating layer 9 in each of the external electrodes 6 and 7 ensures the weather resistance of the monolithic ceramic capacitor 1, and provides good solderability to the external electrodes 6 and 7 when the monolithic ceramic capacitor 1 is surface-mounted.

In order to adjust the equivalent series resistance (ESR) of the monolithic ceramic capacitor 1, the resistance values of the external electrodes 6 and 7 are adjusted. The resistance values of the external electrodes 6 and 7 are controlled substantially by the resistance value of the electrically conductive layer 8. In the electrically conductive layer 8, the compound oxide, e.g., the In—Sn compound oxide, functions as an electrically conductive component having a predetermined resistance value, and the glass component functions as an electrically insulating component. Therefore, the adjustment of the resistance value of the electrically conductive layer 8 is easily performed by changing at least one of the amount of added glass component included therein and the glass softening point, as is ascertained in the Experimental example described below.

When the electrically conductive layer 8 further includes an electrically conductive metal component, e.g., Ag, this electrically conductive metal component functions as an electrically conductive component for reducing the resistance value. Conversely, when the electrically conductive layer 8 further includes an insulating oxide, e.g., $Al_2O_3$ or $ZrO_2$, this insulating oxide functions as an insulating component for increasing the resistance value. Therefore, in this case, the resistance value of the electrically conductive layer 8, and accordingly the resistance values of the external electrodes 6 and 7, can be adjusted by changing at least one of the amount of added glass component, the glass softening point, and the amount of added electrically conductive metal component or insulating oxide. As a result, the ESR of the monolithic ceramic capacitor 1 can be adjusted.

Figure 2:
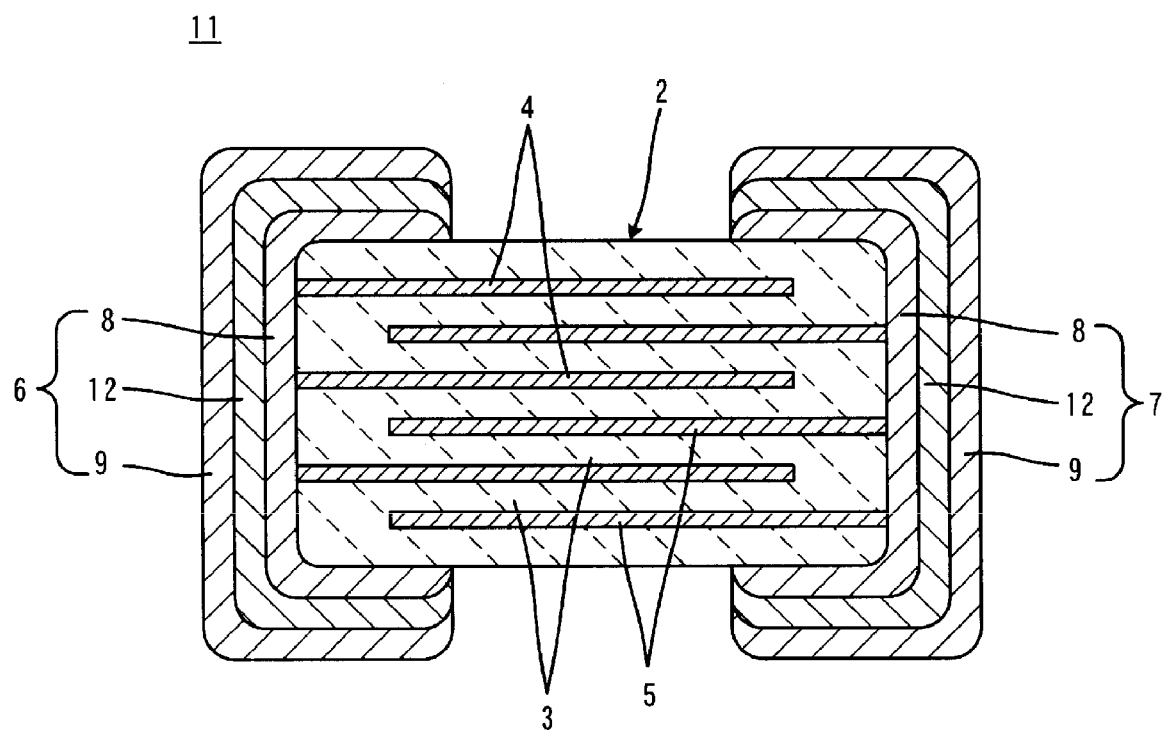
FIG. 2 is a front view illustrating a monolithic ceramic capacitor 11 according to a second preferred embodiment of the present invention with reference to a cross section along the stacking direction.

FIG. 2 shows a monolithic ceramic capacitor 11 according to a second preferred embodiment of the present invention. The monolithic ceramic capacitor 11 shown in FIG. 2 includes many elements common to those in the monolithic ceramic capacitor 1 shown in the above-described FIG. 1. Therefore, in FIG. 2, the elements corresponding to the elements shown in FIG. 1 are indicated by the same reference numerals as those set forth above and explanations thereof are omitted.

In the monolithic ceramic capacitor 11 shown in FIG. 2, each of external electrodes 6 and 7 further includes a second electrically conductive layer 12 including Cu or a Cu alloy. The second electrically conductive layer 12 is disposed on the outer surface side of the first electrically conductive layer 8, that is, between the first electrically conductive layer 8 and the metal plating layer 9.

For example, the second electrically conductive layer 12 can be formed by applying a paste including a Cu powder or a Cu alloy powder, glass frit, and an organic vehicle to the first electrically conductive layer 8 so as to cover the first electrically conductive layer 8, followed by baking.

According to the second preferred embodiment, the weather resistance of the monolithic ceramic capacitor 11 is further improved by the presence of the second electrically conductive layer 12. In addition, the monolithic ceramic capacitor 11 can be provided with adequate plating resistance required in the plating step for forming the metal plating layer 9.

Figure 3:
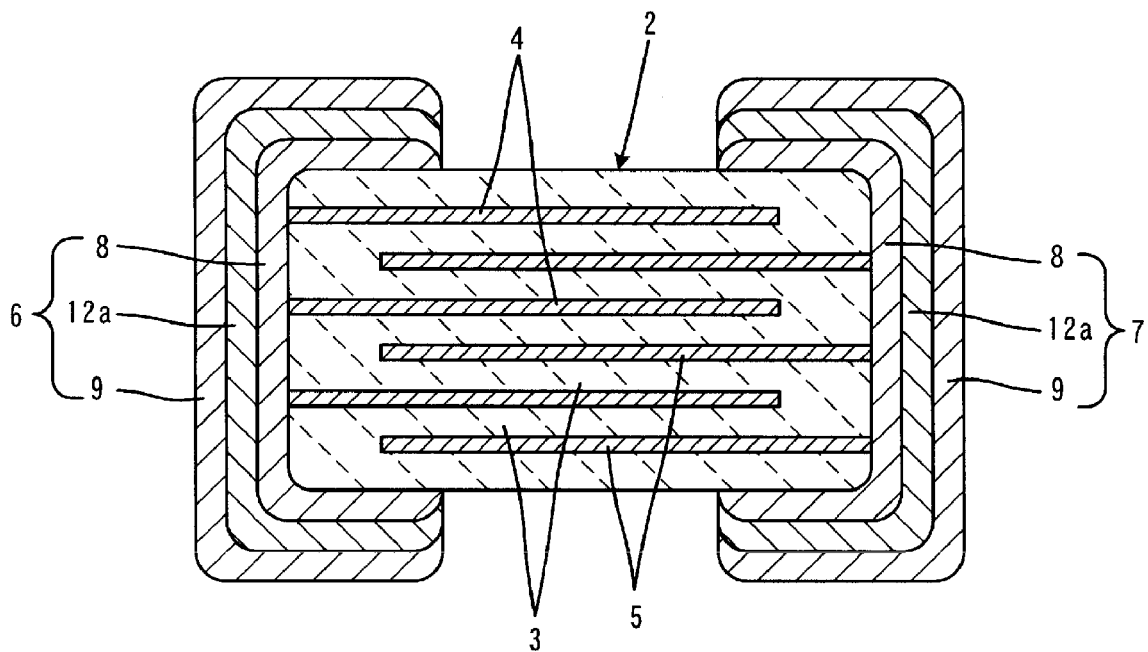
FIG. 3 is a front view illustrating a monolithic ceramic capacitor 21 according to a third preferred embodiment of the present invention with reference to a cross section along the stacking direction.

FIG. 3 shows a monolithic ceramic capacitor 21 according to a third preferred embodiment of the present invention. The monolithic ceramic capacitor 21 shown in FIG. 3 includes many elements common to those in the monolithic ceramic capacitor 1 shown in the above-described FIG. 1 or the monolithic ceramic capacitor 11 shown in FIG. 2. Therefore, in FIG. 3, the elements corresponding to the elements shown in FIG. 1 or FIG. 2 are indicated by the same reference numerals as those set forth above and explanations thereof are omitted.

In the monolithic ceramic capacitor 21 shown in FIG. 3, each of external electrodes 6 and 7 further includes a second electrically conductive layer 12a including an electrically conductive resin primarily including an electrically conductive metal component and a thermosetting resin. The second electrically conductive layer 12a is disposed on the outer surface side of the first electrically conductive layer 8, that is, between the first electrically conductive layer 8 and the metal plating layer 9.

For example, the second electrically conductive layer 12a can be formed by applying an electrically conductive resin including an electrically conductive metal component, e.g., a Ag powder, and a thermosetting resin, e.g., a phenol resin, to the first electrically conductive layer 8 so as to cover the first electrically conductive layer 8, followed by heat curing.

According to the third preferred embodiment, not only the weather resistance is improved and the plating resistance is provided by the presence of the second electrically conductive layer 12a, as in the second preferred embodiment, but also the resistance values of the external electrodes 6 and 7 can be adjusted by changing the amount of added electrically conductive metal component included in the second electrically conductive layer 12a. That is, the exposure factor of the electrically conductive metal component at the surface of the second electrically conductive layer 12a is changed by changing the amount of added electrically conductive metal component and, thereby, the resistance values of the external electrodes 6 and 7 can be adjusted.

The second electrically conductive layer 12a can be formed by a heat-curing treatment at a relatively low temperature of about 250° C., for example. Therefore, the energy required for heating in this heat curing is reduced, and heating facilities can be further simplified, so that the steps can be further simplified.

In the first and the second preferred embodiments, the first electrically conductive layer 8 may or may not include the electrically conductive metal component, e.g., Ag, or the insulating oxide, e.g., $Al_2O_3$ or $ZrO_2$.

Figure 4:
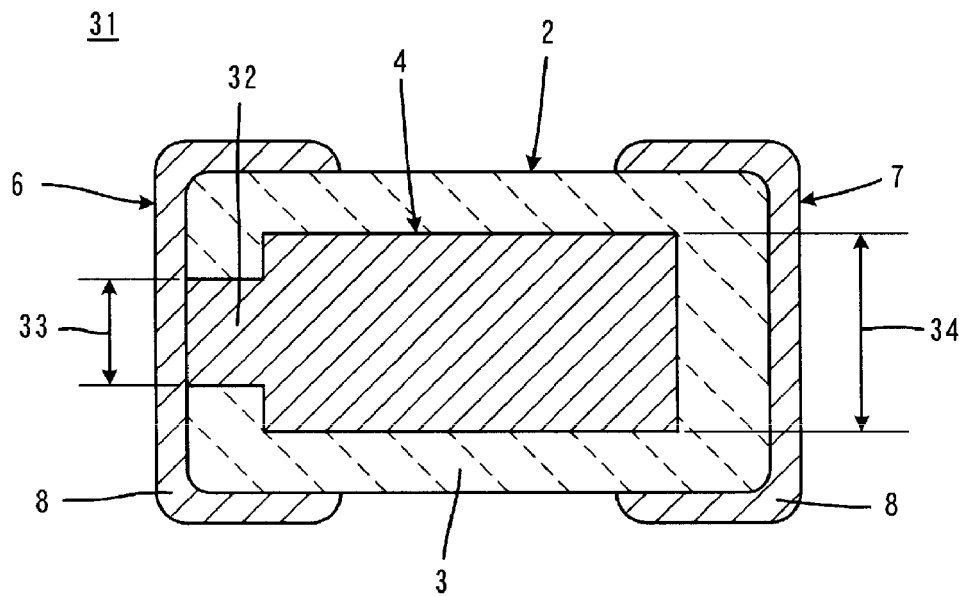
FIG. 4 is a plan view illustrating a monolithic ceramic capacitor 31 according to a fourth preferred embodiment of the present invention with reference to a cross section extending in a direction of a principal surface of a ceramic layer 3.

FIG. 4 is a plan view illustrating a monolithic ceramic capacitor 31 according to a fourth preferred embodiment of the present invention with reference to a cross section extending in a direction of a principal surface of a ceramic layer 3. The monolithic ceramic capacitor 31 shown in FIG. 4 includes many elements common to those in the monolithic ceramic capacitor 1 shown in the above-described FIG. 1. Therefore, in FIG. 4, the elements corresponding to the elements shown in FIG. 1 are indicated by the same reference numerals as those set forth above and explanations thereof are omitted.

In the monolithic ceramic capacitor 31, the length 33 of a side of the lead portion 32 of the internal electrode 4, which is in contact with the first electrically conductive layer 8 and which is electrically connected to the external electrode 6, is less than the length 34 of the side of the internal electrode 4, which is opposed to the lead portion 32. Although not shown in FIG. 4, substantially the same configuration as that of the internal electrode 4 is used for the internal electrode 5 opposed to the internal electrode 4 with the ceramic layer 3 therebetween.

The above-described structural features result from the application of the following ESR adjusting method.

In the above-described first to third preferred embodiments, the ESRs of the monolithic ceramic capacitors 1, 11, and 21 are adjusted by adjusting the resistance values of the external electrodes 6 and 7 themselves. However, in the fourth preferred embodiment, the ESR of the monolithic ceramic capacitor 31 is adjusted by changing the length 33 of the side of the lead portion 32, which is in contact with the first electrically conductive layer 8, in addition to the adjustment of the resistance values of the external electrodes 6 and 7.

Where the first electrically conductive layer has a relatively high resistance value, the ESR of the monolithic ceramic capacitor 31 can be changed to a relatively large degree by changing the length 33 of the side of the lead portion 32, which is in contact with the first electrically conductive layer 8, as is clear from Experimental example described below. Therefore, according to the fourth preferred embodiment, a wider adjustment width can be achieved with respect to the ESR adjustment.

In the above-described description, the length 33 of the side of the lead portion 32 in the internal electrode 4 is changed. Preferably, the length of the side of the lead portion in the other internal electrode 5 is similarly changed. The lengths of the sides of all the internal electrodes 4 and 5 may not be changed to adjust the ESR. The change of length of the side may be performed in at least one of the internal electrodes 4 and 5.

The external electrodes 6 and 7 disposed in the monolithic ceramic capacitor 31 shown in FIG. 4 include only the first electrically conductive layer 8. However, this is not an essential feature of the fourth preferred embodiment. The configuration included in the external electrodes 6 and 7 shown in FIG. 1, FIG. 2, or FIG. 3 may be used in the monolithic ceramic capacitor 31 according to the fourth preferred embodiment.

Up to this point, the present invention has been described with reference to illustrated preferred embodiments. However, other various modifications can be made within the scope of the present invention.

For example, the external electrodes 6 and 7 include the electrically conductive layers 8 and the metal plating layer 9 in the first preferred embodiment, and have the layered structures including the first electrically conductive layers 8, the second electrically conductive layer 12 or 12a, and the metal plating layer 9 in the second and the third preferred embodiments. However, layers having other functions may be further interposed between these layers.

In the illustrated preferred embodiments, both of the external electrodes 6 and 7 include the electrically conductive layer 8 and, thereby, are also provided with the function of the resistance element. However, the structure including the electrically conductive layer 8 for providing the function of the resistance element may be used in only one of the external electrodes 6 and 7.

The experimental examples produced to determine the effects of the present invention will be described below.

EXPERIMENTAL EXAMPLE 1

Experimental example 1 was produced to determine the effects of the compound oxide, which constitutes a distinctive configuration of the present invention and which reacts with Ni or a Ni alloy, in particular the In—Sn compound oxide and the La—Cu compound oxide.

A capacitor main body designed such that an internal electrode includes Ni and the capacitance becomes 1 µF was prepared for a monolithic ceramic capacitor by a known method.

On the other hand, in order to form an electrically conductive layer including a resistance component, an electrically conductive layer paste was prepared as described below, in the example within the scope of the present invention.

In an example including the In—Sn compound oxide, an $In_2O_3$ powder was mixed with a $SnO_2$ powder such that the content of the $SnO_2$ powder is 5 percent by weight relative to a total amount of the $In_2O_3$ powder and the $SnO_2$ powder, and calcination was performed in air at about 1,400° C. for about 5 hours, so that $SnO_2$ was allowed to adequately form a solid solution. Thereafter, a grinding treatment was performed until the average particle diameter became about 1 µm, so that an In—Sn compound oxide powder was produced. It was ascertained that even when the amount of the above-described added $SnO_2$ powder was varied within the range of about 1 to about 15 percent by weight, the In—Sn compound oxide exhibited approximately the same electrical conductivity.

The In—Sn compound oxide powder was mixed with glass frit (B—Si—Zn—Ba—Ca—Al based glass, softening point: about 560° C., average particle diameter: about 1 µm) and an organic vehicle including 80 parts by weight of terpineol based organic solvent and 20 parts by weight of acrylic resin binder in such a way that a volume ratio, "In—Sn compound oxide":"glass":"organic vehicle", became 1:1:8, and a roll dispersion treatment was performed, so that an electrically conductive layer paste including the In—Sn compound oxide was produced.

Each end portion of the capacitor main body was coated with the above-described electrically conductive layer paste by a dip method, followed by drying at a temperature of about 150° C. for about 10 minutes. The coating film thickness after the drying was about 60 µm.

The capacitor main body coated with the electrically conductive layer paste and dried, as described above, was passed through a continuous belt furnace, so as to be subjected to a heat treatment that is maintained at a maximum temperature of about 780° C. for about 15 minutes in a $N_2$ atmosphere (oxygen concentration: about 10 ppm or less), so that a sample monolithic ceramic capacitor was produced.

In an example including the La—Cu compound oxide, an $La_2O_3$ powder and a CuO powder was mixed at a molar ratio of 1:1, and calcination was performed in air at about 1,500° C. for about 5 hours, so that the reaction was adequately performed. Thereafter, a grinding treatment was performed until the average particle diameter became about 1 µm, so that an La—Cu compound oxide powder was produced.

Subsequently, an electrically conductive layer paste including the La—Cu compound oxide was produced through the operation similar to that for the above-described In—Sn compound oxide powder. A sample monolithic ceramic capacitor was produced using the resulting paste.

For Comparative examples, an electrically conductive paste was prepared using $RuO_2$, a Ca—Sr—Ru compound oxide, or graphite in place of the In—Sn compound oxide or the La—Cu compound oxide. A sample monolithic ceramic capacitor was prepared in a manner similar to those in the example.

The capacitance and the ESR of the monolithic ceramic capacitor of each sample were measured and, in addition, it was evaluated whether the reduction of the resistance component included in the electrically conductive layer occurred by using X-ray diffraction. The results thereof are shown in Table 1.

TABLE 1

| Electrically conductive layer resistance component | Capacitance (µF) | ESR (mΩ) | Occurrence of reduction |
|---|---|---|---|
| In—Sn compound oxide | 1.07 | 252 | none |
| La—Cu compound oxide | 1.07 | 3528 | none |
| $RuO_2$ | 1.07 | 19.5 | yes |
| Ca—Sr—Ru compound oxide | 0.002 | measurement was impossible | none |
| Graphite | 0.001 | measurement was impossible | — |

In Table 1, the capacitance and the ESR are represented by an average value of ten samples.

As shown in Table 1, when the In—Sn compound oxide or the La—Cu compound oxide was used in the electrically conductive layer defining the external electrode, reduction does not occur by a heat treatment in the $N_2$ atmosphere, the capacitance was obtained as designed, and sufficiently large ESR was obtained.

On the other hand, in a comparative example in which $RuO_2$ was used, reduction occurred by a heat treatment in the $N_2$ atmosphere, and a relatively small ESR was obtained.

In a comparative example in which Ca—Sr—Ru compound oxide was used, although reduction did not occur by a heat treatment in the $N_2$ atmosphere, a good electrical connection state between the electrically conductive layer and the internal electrode was not ensured. Consequently, the measured capacitance was very small, and the measurement of ESR was impossible.

In a comparative example in which graphite was used as well, the measured capacitance was very small, and the measurement of ESR was impossible.

EXPERIMENTAL EXAMPLE 2

Experimental example 2 was prepared to ascertain that the ESR of the monolithic ceramic capacitor was able to be adjusted by the amount of added glass component included in the electrically conductive layer, the glass softening point, and the amount of added electrically conductive metal component.

(1) ESR Adjustment by Amount of Added Glass Component

In the electrically conductive layer paste including the In—Sn compound oxide prepared as the example in the above-described Experimental example 1, the volume ratio, "In—Sn compound oxide":"glass" was 1:1 (=5:5). In addition to this, an electrically conductive paste having the volume ratio of 8:2 and an electrically conductive paste having the volume ratio of 7:3 were prepared individually. A sample monolithic ceramic capacitor was prepared in a manner similar to that in Experimental example 1, the ESRs of ten samples were measured, and the average value and the standard deviation thereof were determined. Furthermore, the dispersion (3CV) thereof was determined on the basis of the following equation.

$$3CV[\%]=3\text{(standard deviation)}/\text{(average value)}\times100$$

The determined average values and dispersions (3CV) are shown in Table 2.

TABLE 2

| In—Sn compound oxide:Glass | ESR | |
| --- | --- | --- |
| | Average value (mΩ) | 3CV (%) |
| 8:2 | 92 | 8.7 |
| 7:3 | 160 | 9.5 |
| 5:5 | 252 | 8.0 |

In Table 2, the sample exhibiting "In—Sn compound oxide":"glass" of "5:5" is equivalent to the example in Experimental example 1.

As shown in Table 2, the ESR could be adjusted by changing the amount of added glass component, and the dispersion of the adjusted ESR was relatively small.

(2) ESR Adjustment by Glass Softening Point

In the electrically conductive layer paste including the In—Sn compound oxide prepared as the example in Experimental example 1, the glass component having the softening point of about 560° C. was included. In addition, an electrically conductive layer paste including the same composition based glass component having a softening point of about 580° C. and an electrically conductive layer paste including a glass component having a softening point of about 600° C. were further prepared. A sample monolithic ceramic capacitor was prepared from each of the electrically conductive layer pastes in a manner similar to that in Experimental example 1. The ESRs of ten samples were measured, and the average value thereof was determined. Furthermore, the dispersion (3CV) thereof was determined. The results thereof are shown in Table 3.

TABLE 3

| Glass softening point | ESR | |
| --- | --- | --- |
| | Average value (mΩ) | 3CV (%) |
| about 560° C. | 252 | 8.0 |
| about 580° C. | 521 | 10.5 |
| about 600° C. | 1813 | 14.1 |

In Table 3, the sample exhibiting "glass softening point" of "about 560° C." is equivalent to the example in Experimental example 1.

As shown in Table 3, the ESR could be adjusted by changing the glass softening point of the glass component included in the electrically conductive layer paste, and the dispersion of the adjusted ESR was relatively small.

In this experiment, the glass softening point was changed by using the same composition based glass component as in the example of Experimental example 1 and changing the ratio of the constituent elements. However, the glass softening point may be changed by changing the types of constituent elements.

(3) ESR Adjustment by Addition of Metal

In the electrically conductive layer paste including the In—Sn compound oxide prepared as the example in Experimental example 1, the electrically conductive metal component was not included. However, electrically conductive pastes in which an Ag powder was added such that the content thereof is about 5 percent by volume, 10 percent by volume, and 20 percent by volume, respectively, relative to the total amount of the Ag powder and the In—Sn compound oxide powder were further prepared. A sample monolithic ceramic capacitor was prepared from each of the electrically conductive layer pastes in a manner similar to that in Experimental example 1. The ESRs of ten samples were measured, and the average value thereof was determined. Furthermore, the dispersion (3CV) thereof was determined. The results thereof are shown in Table 4.

TABLE 4

| Amount of addition of Ag | ESR | |
| --- | --- | --- |
| | Average value (mΩ) | 3CV (%) |
| 0 percent by volume | 252 | 8.0 |
| 5 percent by volume | 181 | 10.5 |
| 10 percent by volume | 149 | 14.1 |
| 20 percent by volume | 98 | 13.3 |

In Table 4, the sample exhibiting "amount of addition of Ag" of "0" is equivalent to the example in Experimental example 1.

As shown in Table 4, the ESR could be adjusted by adding the electrically conductive metal component to the electrically conductive layer paste or changing the amount of added electrically conductive metal component, and the dispersion of the adjusted ESR was relatively small.

(4) ESR Adjustment by Addition of Insulating Oxide

In the electrically conductive layer paste including the In—Sn compound oxide prepared as the example in Experimental example 1, the insulating oxide was not included. However, electrically conductive layer pastes in which an $Al_2O_3$ powder or a $ZrO_2$ powder as the insulating oxide was added such that the content thereof becomes about 5 percent by volume, about 10 percent by volume, and about 20 percent by volume, respectively, relative to the total amount of the $Al_2O_3$ powder or the $ZrO_2$ powder and the In—Sn compound oxide powder were prepared. A sample monolithic ceramic capacitor was prepared from each of the electrically conductive layer pastes in a manner similar to that in Experimental example 1. The ESRs of ten samples were measured, and the average value thereof was determined. Furthermore, the dispersion (3CV) thereof was determined. The results thereof are shown in Table 5 and Table 6.

TABLE 5

| Amount of addition of $Al_2O_3$ | ESR | |
| --- | --- | --- |
| | Average value (mΩ) | 3CV (%) |
| 0 | 252 | 8.0 |
| 5 | 308 | 12.5 |
| 10 | 653 | 17.1 |
| 20 | 2432 | 18.3 |

TABLE 6

| Amount of addition of ZrO$_2$ | ESR Average value (mΩ) | 3CV (%) |
|---|---|---|
| 0 | 252 | 8.0 |
| 5 | 350 | 11.9 |
| 10 | 809 | 15.4 |
| 20 | 2745 | 16.3 |

In Table 5 and Table 6, the samples exhibiting "amount of addition of Al$_2$O$_3$" of "0" and "amount of addition of ZrO$_2$" of "0", respectively, are equivalents to the example in Experimental example 1.

As shown in Table 5 and Table 6, the ESR could be adjusted by adding the insulating oxide to the electrically conductive layer paste or changing the amount of added insulating oxide, and the dispersion of the adjusted ESR was relatively small.

EXPERIMENTAL EXAMPLE 3

Experimental example 3 was prepared to ascertain the effects of the disposition of the second electrically conductive layer, which includes Cu or the Cu alloy, between the electrically conductive layer, that is, the first electrically conductive layer and the metal plating layer, where the metal plating layer is disposed on the outer surface side of the electrically conductive layer.

In Experimental example 3, the first electrically conductive layer paste, in which about 10 percent by volume of Ag powder described in item (3) of Experimental example 2 was added relative to a total amount of the Ag powder and the In—Sn compound oxide powder, was used. A monolithic ceramic capacitor was prepared in a manner similar to that in Experimental example 1 except that the thickness of the first electrically conductive layer paste after application and drying was set at about 40 μm and a heat treatment at a maximum temperature of about 700° C. for about 15 minutes was used.

Half of the resulting monolithic ceramic capacitors were coated with an electrically conductive paste including a Cu powder, glass, and an organic vehicle so as to cover the first electrically conductive layer. Both of the samples coated with the electrically conductive paste, as described above, and the samples not coated with the electrically conductive paste were subjected to a second baking in a N$_2$ atmosphere at a maximum temperature of about 750° C. for about 15 minutes. With respect to the sample coated with the electrically conductive paste, the second electrically conductive layer was formed on the first electrically conductive layer. The ESR of each sample was measured at this stage.

A known barrel plating method was applied to all of the samples, so that Ni plating and Sn plating were applied sequentially. The ESR after the plating was measured. The rates of change of the ESR after the plating relative to the ESR before the plating of ten samples were calculated, and an average value thereof was determined. A reliability test was performed by applying a voltage and standing at a high temperature, and an average life until the insulation resistance value was two orders of magnitude reduced was determined. The results thereof are shown in Table 7.

TABLE 7

| Second electrically conductive layer | Rate of change of ESR after plating | Average life (hour) |
|---|---|---|
| none | −24% | 75 |
| present | −1.8% | >100 |

As shown in Table 7, when the second electrically conductive layer was present under the metal plating layer, the rate of change of the ESR was reduced and the average life was increased. Therefore, excellent plating resistance and excellent weather resistance were achieved.

EXPERIMENTAL EXAMPLE 4

Experimental example 4 was prepared to determine the effects of disposition of the second electrically conductive layer, which includes the electrically conductive resin primarily including the electrically conductive metal component and the thermosetting resin, between the electrically conductive layer, that is, the first electrically conductive layer and the metal plating layer where the metal plating layer is disposed on the outer surface side of the electrically conductive layer.

In the Experimental example 4, with respect to the electrically conductive layer paste, an In—Sn compound oxide powder similar to that prepared in Experimental example 1 was mixed with glass frit and an organic vehicle similar to those used in Experimental example 1, as well as a Ag powder (average particle diameter: about 1 μm) for adjusting the resistance value, such that a volume ratio, "In—Sn compound oxide":"glass":"Ag":"organic vehicle" becomes 9.7:10:0.3:80, and a roll dispersion treatment was performed, so that a first electrically conductive layer paste was produced.

Each end portion of a capacitor main body similar to that used in Experimental example 1 was coated with the above-described first electrically conductive layer paste by a dip method, followed by drying at a temperature of about 150° C. for about 10 minutes. The coating film thickness after the drying was about 60 μm.

The capacitor main body coated with the first electrically conductive layer paste and dried, as described above, was passed through a continuous belt furnace, so as to be subjected to a heat treatment at a maximum temperature of about 780° C. for about 15 minutes in a N$_2$ atmosphere (oxygen concentration: about 10 ppm or less), so that a monolithic ceramic capacitor, in which the first electrically conductive layer was disposed in the external electrode, was produced. When the ESR was measured at this stage, the average value of ten samples was 134 mΩ.

Subsequently, an electrically conductive resin including an Ag powder as the electrically conductive metal component and a phenol resin as the thermosetting resin was applied to the first electrically conductive layer of the above-described monolithic ceramic capacitor, and this was cured under the curing condition of a temperature of about 250° C. for about 60 minutes, so that a second electrically conductive layer was formed. The ESR was measured at this stage (before plating). This ESR is shown in the column "Before plating" in Table 8.

Here, three types of electrically conductive resins in which the volume ratios of Ag were different, that is, the electrically conductive resin related to each of Sample Nos. 1, 2, and 3, was prepared as the above-described electrically conductive resin, and the samples having different Ag exposure factors were prepared, as shown in Table 8.

A known barrel plating method was performed and, thereby, Ni plating and Sn plating were applied sequentially.

The ESR after the plating was also measured. The rate of change of the ESR after the plating relative to the ESR before the plating was determined. The results thereof are shown in each of the columns "After plating" and "Rate of change of ESR after plating" in Table 8.

TABLE 8

| Sample No. | Ag exposure factor | Before plating | After plating | Rate of change of ESR after plating |
|---|---|---|---|---|
| 1 | 49.6% | 284 mΩ | 285 mΩ | ±0% |
| 2 | 30.3% | 483 mΩ | 488 mΩ | +1% |
| 3 | 23.7% | 625 mΩ | 631 mΩ | +1% |

The values shown in Table 8 are average values of ten samples.

When comparisons are made between the ESR value shown in the column "Before plating" and the above-described ESR value of "134 mΩ" before formation of the second electrically conductive layer, it is clear that the ESR value is increased by the formation of the second electrically conductive layer and, therefore, the ESR value can also be changed by the formation of the second electrically conductive layer.

It is clear on the basis of the values in the columns "Before plating", "After plating", and "Rate of change of ESR after plating" that the ESR values are not substantially changed between before and after the plating and, therefore, adequate plating resistance is provided by the formation of the second electrically conductive layer.

Figure 5:
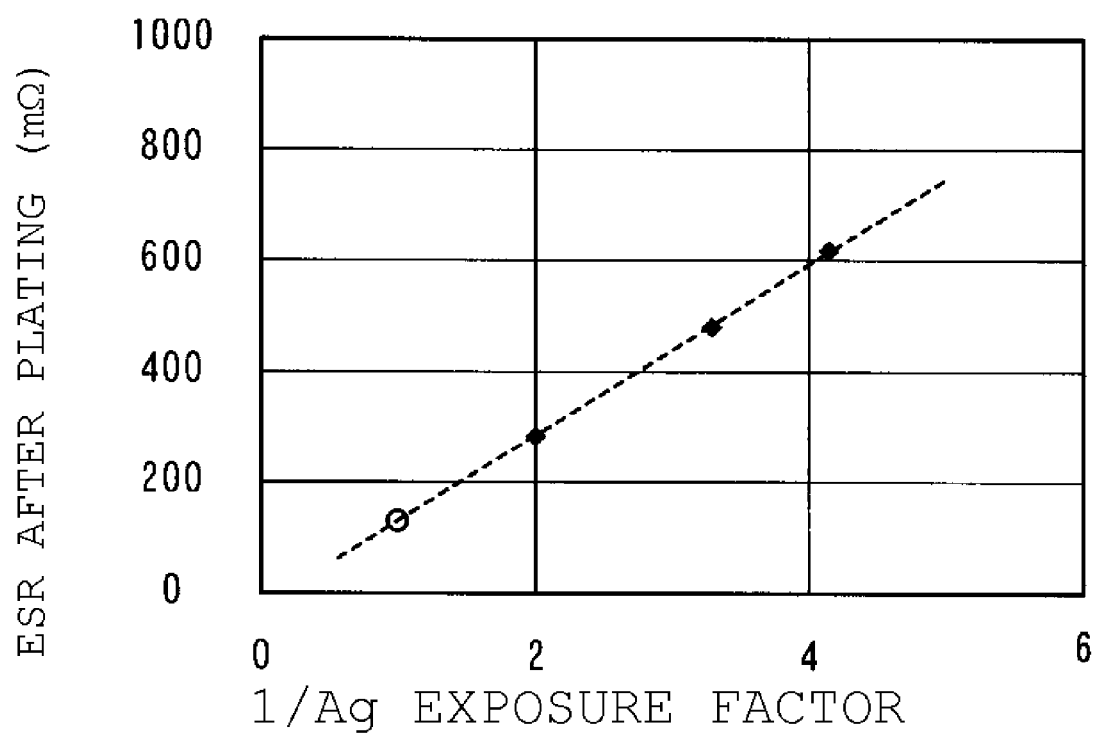
FIG. 5 is a diagram showing the relationship between the Ag exposure factor and the ESR based on the data obtained in Experimental example 4.

FIG. 5 shows the relationship between the reciprocal of the Ag exposure factor, that is, "1/Ag exposure factor", of the second electrically conductive layer and "ESR after plating". The "1/Ag exposure factor" is expressed such that the Ag exposure factor of 100% is assumed to be "1". In FIG. 5, the point plotted with "○" indicates the situation before the formation of the second electrically conductive layer, that is, where the surface of the external electrode is entirely covered with the electrically conductive metal (corresponding to the case where the Ag exposure factor is 100%).

As shown in FIG. 5, good proportionality is observed between the reciprocal of the Ag exposure factor and the ESR. This indicates that the resistance value can be controlled by changing the volume ratio (blending ratio) of Ag and, thereby, changing the exposure area of Ag in the second electrically conductive layer.

EXPERIMENTAL EXAMPLE 5

Experimental example 5 was prepared to ascertain that the ESR of the monolithic ceramic capacitor could be adjusted by changing the dimension in the width direction of the lead portion of the internal electrode.

A capacitor main body designed such that an internal electrode includes Ni and the capacitance is about 1 μF was prepared for a monolithic ceramic capacitor by a known method. At this time, three types of capacitor main bodies were prepared, wherein the length of the side of the lead portion of the internal electrode which was exposed at the end surface of the capacitor main body (that is, the dimension in the width direction of the lead portion) was set to about 1,500 μm, about 1,000 μm, or about 500 μm. In each of the three types of capacitor main bodies, the length of the side opposed to the lead portion of the internal electrode was about 3,000 μm.

On the other hand, in order to form an electrically conductive layer including a resistance component, in the example within the scope of the present invention, an electrically conductive layer paste was prepared as described below.

An $In_2O_3$ powder was mixed with a $SnO_2$ powder such that the content of the $SnO_2$ powder is about 5 percent by weight relative to a total amount of the $In_2O_3$ powder and the $SnO_2$ powder, and calcination was performed in air at about 1,400° C. for about 5 hours, so that $SnO_2$ was allowed to adequately form a solid solution. Thereafter, a grinding treatment was performed until the average particle diameter became about 1 μm, so that an In—Sn compound oxide powder was produced.

The produced In—Sn compound oxide powder was mixed with glass frit (B—Si—Zn—Ba—Ca—Al based glass, softening point: about 560° C., average particle diameter: about 1 μm), a Ag powder (average particle diameter: about 1 μm) for controlling the resistance value, and an organic vehicle including 80 parts by weight of terpineol based organic solvent and 20 parts by weight of acrylic resin binder in such a way that a volume ratio, "In—Sn compound oxide":"glass": "Ag":"organic vehicle", became 9.7:10:0.3:80, and a roll dispersion treatment was performed, so that an electrically conductive layer paste was produced.

Each end portion of the prepared capacitor main body was coated with the above-described electrically conductive layer paste by a dip method, followed by drying at a temperature of about 150° C. for about 10 minutes. The coating film thickness after the drying was about 60 μm.

The capacitor main body coated with the electrically conductive layer paste and dried, as described above, was passed through a continuous belt furnace, so as to be subjected to a heat treatment at a maximum temperature of about 780° C. for about 15 minutes in a $N_2$ atmosphere (oxygen concentration: about 10 ppm or less), so that a sample monolithic ceramic capacitor of an example was produced.

On the other hand, for a comparative example, an electrically conductive layer paste including a Cu powder, glass, and an organic vehicle was prepared in place of the electrically conductive layer paste related to the above-described example. Each end portion of the capacitor main body prepared as described above was coated with the resulting electrically conductive layer paste by a dip method, followed by drying. Thereafter, a heat treatment at a maximum temperature of about 750° C. for about 15 minutes in a $N_2$ atmosphere was performed, so that a sample monolithic ceramic capacitor of a comparative example was produced.

Subsequently, the ESR of the monolithic ceramic capacitor of each sample was measured. The results thereof are shown in Table 9.

TABLE 9

| | Dimension in width direction of internal electrode lead portion [μm] | ESR [mΩ] |
|---|---|---|
| Example | 1500 | 134 |
| | 1000 | 301 |
| | 500 | 815 |
| Comparative example | 1500 | 6 |
| | 1000 | 6 |
| | 500 | 7 |

The values shown in Table 9 are average values of ten samples.

As is clear from "Example" in Table 9, where the electrically conductive layer has a relatively high resistance by using the compound oxide, e.g., the In—Sn compound oxide, in the electrically conductive layer defining the external electrode, the ESR could be significantly changed to increase as the dimension in the width direction of the internal electrode lead portion was reduced, that is, the connection area between the internal electrode and the electrically conductive layer was reduced.

On the other hand, in "Comparative example", since a Cu thick film was used in the electrically conductive layer defining the external electrode, the resistance value of the electrically conductive layer was inherently relatively low. Consequently, the ESR was not significantly changed even when the dimension in the width direction of the internal electrode lead portion was changed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A monolithic ceramic capacitor comprising:
   a capacitor main body having a layered structure, in which ceramic layers and internal electrodes are alternately layered;
   external electrodes disposed on an outer surface of the capacitor main body so as to be electrically connected to the internal electrodes; and
   an inter-metallic compound electrically connecting each of the internal electrodes to a respective one of the external electrodes; wherein
   the internal electrodes include at least one of Ni and a Ni alloy;
   the external electrodes include a first electrically conductive layer including a compound oxide, and a glass component;
   the inter-metallic compound includes the at least one of the Ni and the Ni alloy and an element of the compound oxide; and
   the inter-metallic compound is defined by a material resulting from a reaction between the at least one of the Ni and the Ni alloy and the compound oxide.

2. The monolithic ceramic capacitor according to claim 1, wherein the compound oxide includes an In—Sn compound oxide.

3. The monolithic ceramic capacitor according to claim 1, wherein the external electrodes further comprise a metal plating layer disposed on an outer surface side of the first electrically conductive layer.

4. The monolithic ceramic capacitor according to claim 3, wherein the external electrodes further comprise a second electrically conductive layer which is disposed between the first electrically conductive layer and the metal plating layer and which includes Cu or a Cu alloy.

5. The monolithic ceramic capacitor according to claim 3, wherein the external electrodes further comprise a second electrically conductive layer which is disposed between the first electrically conductive layer and the metal plating layer and which includes an electrically conductive resin primarily including an electrically conductive metal component and a thermosetting resin.

6. The monolithic ceramic capacitor according to claim 3, wherein the metal plating layer comprises a Ni plating layer defining a substrate and at least one of a Sn plating layer and a solder plating layer disposed on the Ni plating layer.

7. The monolithic ceramic capacitor according to claim 1, wherein the first electrically conductive layer further comprises at least one of an electrically conductive metal component and an insulating oxide for adjusting a resistance value of the external electrode.

8. The monolithic ceramic capacitor according to claim 1, wherein the internal electrodes comprise lead portions electrically connected to the external electrodes, and in at least one of the internal electrodes, the length of a side of the lead portion, which is in contact with the first electrically conductive layer, is less than the length of a side of the internal electrode, which is opposed to the lead portion.

9. A method for adjusting an equivalent series resistance of a monolithic ceramic capacitor comprising the steps of:
   providing a capacitor main body having a layered structure, in which ceramic layers and internal electrodes are alternately layered, external electrodes disposed on an outer surface of the capacitor main body so as to be electrically connected to the internal electrodes, and an inter-metallic electrically connecting each of the internal electrodes to a respective one of the external electrodes, wherein the internal electrodes include at least one of Ni and a Ni alloy, the external electrodes include an electrically conductive layer including a compound oxide and a glass component, the inter-metallic compound includes the at least one of the Ni and the Ni alloy and an element of the compound oxide, and the inter-metallic compound is defined by a material resulting from a reaction between the at least one of the Ni and the Ni alloy and the compound oxide; and
   adjusting a resistance value of the external electrodes by changing at least one of the amount of added glass component included in the electrically conductive layer and a glass softening point.

10. The method for adjusting an equivalent series resistance of a monolithic ceramic capacitor according to claim 9, wherein the compound oxide includes an In—Sn compound oxide.

11. The method for adjusting an equivalent series resistance of a monolithic ceramic capacitor according to claim 9, wherein the internal electrodes comprise lead portions electrically connected to the external electrodes, the method further comprising the step of adjusting the equivalent series resistance by changing the length of a side of the lead portion, which is in contact with the first electrically conductive layer, in at least one of the internal electrodes.

12. A method for adjusting an equivalent series resistance of a monolithic ceramic capacitor comprising the steps of:
   providing a capacitor main body having a layered structure, in which ceramic layers and internal electrodes are alternately layered, external electrodes disposed on an outer surface of the capacitor main body so as to be electrically connected to the internal electrodes, and an inter-metallic electrically connecting each of the internal electrodes to a respective one of the external electrodes, wherein the internal electrodes include at least one of Ni and a Ni alloy, the external electrodes include an electrically conductive layer including a compound oxide, and a glass component, the inter-metallic compound includes the at least one of the Ni and the Ni alloy and an element of the compound oxide, and the inter-metallic compound is defined by a material resulting from a reaction between the at least one of the Ni and the Ni alloy and the compound oxide; and
   adjusting a resistance value of the external electrodes by changing at least one of the amount of added glass component included in the electrically conductive layer, a glass softening point, and the amount of added electrically conductive metal component or the insulating oxide.

13. The method for adjusting an equivalent series resistance of a monolithic ceramic capacitor according to claim 12, wherein the compound oxide includes an In—Sn compound oxide.

14. The method for adjusting an equivalent series resistance of a monolithic ceramic capacitor according to claim 12, wherein the internal electrodes comprise lead portions electrically connected to the external electrodes, the method further comprising the step of adjusting the equivalent series resistance by changing the length of a side of the lead portion, which is in contact with the first electrically conductive layer, in at least one of the internal electrodes.

* * * * *

UNITED STATES PATENT AND TRADEMARK OFFICE
CERTIFICATE OF CORRECTION

| | | |
|---|---|---|
| PATENT NO. | : 7,659,568 B2 | Page 1 of 1 |
| APPLICATION NO. | : 11/670540 | |
| DATED | : February 9, 2010 | |
| INVENTOR(S) | : Kusano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

Thirtieth Day of November, 2010

David J. Kappos
*Director of the United States Patent and Trademark Office*